(12) United States Patent
Lacour

(10) Patent No.: US 6,463,972 B1
(45) Date of Patent: Oct. 15, 2002

(54) INJECTABLE SAFETY SUPPORT OF ELASTOMERIC MATERIAL FOR TIRES

(75) Inventor: Jean-Charles Lacour, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/435,539

(22) Filed: Nov. 8, 1999

Related U.S. Application Data

(60) Provisional application No. 60/114,619, filed on Jan. 4, 1999.

(30) Foreign Application Priority Data

Nov. 12, 1998 (FR) .............................................. 98 14244

(51) Int. Cl.[7] .............................................. B60C 17/06
(52) U.S. Cl. ...................... 152/158; 152/323; 152/324; 152/520; 156/112; 156/125
(58) Field of Search ................................. 152/158, 520, 152/302, 315, 323, 324, 393; 156/125, 112, 113; 264/328.3

(56) References Cited

U.S. PATENT DOCUMENTS

| | | | |
|---|---|---|---|
| 1,351,856 A | * | 9/1920 | Lambert ...................... 156/112 |
| 1,860,362 A | * | 5/1932 | Jones .......................... 152/158 |
| 3,141,491 A | * | 7/1964 | Ludewig et al. ............. 152/323 |
| 4,248,286 A | | 2/1981 | Curtiss, Jr. et al. |
| 5,429,165 A | * | 7/1995 | Ichikawa et al. ........... 152/323 |
| 5,634,993 A | | 6/1997 | Drieux et al. |
| 5,891,279 A | | 4/1999 | Lacour |

FOREIGN PATENT DOCUMENTS

EP         0721854         7/1996

* cited by examiner

Primary Examiner—Geoffrey L. Knable
(74) Attorney, Agent, or Firm—Baker Botts L.L.P.

(57) ABSTRACT

A safety support including a body and a base having a substantially cylindrical radially internal face intended to be mounted around a tire rim, the base including a set of substantially inextensible circumferential reinforcing wires wrapped in an elastomer substance, the support being provided by injection under pressure into a closed cavity from feed points located on the support body, the base including supplementary reinforcing elements arranged radially, at least in part, externally relative to all the circumferential reinforcing wires and axially with respect to the feeding points.

10 Claims, 2 Drawing Sheets

INJECTABLE SAFETY SUPPORT OF ELASTOMERIC MATERIAL FOR TIRES

This application claims the benefit of provisional application Ser. No. 60/114,619, filed Jan. 4, 1999.

BACKGROUND OF THE INVENTION

The present invention concerns the manufacture of elastic casings as supports used inside tires to support the load in the event of a puncture or blowout. More precisely, it concerns the production of supports which have at the base a substantially inextensible belt made of reinforcing wires of the type normally used to reinforce tires.

Patent application EP 0,796,747 describes a particular example of such a support. In FIG. 1 of said application EP 0,796,747, it can be seen that the base 10 of the support is reinforced by wires 11 arranged substantially at zero degree with respect to a plane perpendicular to the axis of rotation of the support.

In this application, the term "wire" covers both mono and multifilaments, or an assembly, such as cables, cords or actually any type of equivalent assembly, regardless of the material and treatment of these wires, for example, surface treatment or sheathing or presizing to promote adherence to the rubber. The term "zero degree" refers to an angle measured with respect to the circumferential direction, in other words, with respect to a plane perpendicular to the axis of rotation of the support (an "equatorial plane"), thus observing the usual conventions for tires. The angle is said to be "substantially" equivalent to zero degree because the reinforcement that makes it possible to oppose centrifugation of the support is accomplished by the winding of a wire or bead strip of parallel wires with a certain installation pitch, so that the angle is not zero degree in the strict sense of the term, but it is in practice at least locally slightly greater than zero degree in order to be able to sweep the entire desired width.

A suitable material for making such a support is rubber.

Different techniques are known for manufacturing a molded object: compression molding, transfer molding, injection molding. Compression molding presupposes the introduction of the volume of rubber needed inside the mold before closing it, whereas transfer molding and injection molding both assume that the mold will be closed prior to introduction of the volume of rubber required in the mold. The choice is a function specifically of the proposed production runs, with injection molding, while more expensive in terms of initial investment, having a lower marginal cost and permitting more uniform pressure and temperature of the material during the vulcanizing reaction, and making it possible to achieve a higher geometric quality.

But injection, as well as transfer, molding do not lend themselves to non-homogeneous products reinforced by flexible reinforcements. In particular, these processes, entailing the introduction of material into a closed mold, are poorly adapted when the reinforcement is a ply of wires because the wires do not stay put, or stay put very poorly, in the mold. The rubber pressed down into the mold brings the wires with it when it fills the mold. It therefore poses a major problem in assuring a precise positioning of the wires in the vulcanized support. This is why the process of pressing rubber into a closed mold for wire-reinforced rubber parts is not used. For example, it is well known that the tires are not injected; first, a rough blank is made that is rather close to the final form of tire to be manufactured, the blank including reinforcing wires inserted at the design point between the different layers of rubber; then the molding is done by closing the necessary molding components around the blank.

SUMMARY OF THE INVENTION

An object of the invention is a support such as described in patent application EP 0,796,747 that can be made by pressing material down into a previously closed mold, while ensuring that the position of the reinforcing wires desired by the designer of the support is fully respected.

The safety support according to the invention is intended to be mounted on a tire rim of a vehicle. The support includes an axis of rotation, a base defined by a substantially cylindrical radially internal face designed to be mounted around the rim, and a body forming the support attached to the base. The base includes a set of substantially inextensible circumferential reinforcing wires sheathed in an elastomer material. The support is made by injection under pressure into a closed cavity through feed points arranged on the body of the support. This support is characterized in that the base includes supplementary reinforcing elements arranged, at least in part, radially and externally relative to all the circumferential reinforcing wires and axially with respect to the feed points.

Preferably, the supplementary reinforcing elements include reinforcing wires oriented at an angle $\alpha$ equal to or greater than 60 degrees relative to the circumferential direction.

The supplementary reinforcing elements contain the movements of the circumferential reinforcing wires during the pressurized injection into the mold cavity. It is these supplementary elements that first come into contact with the injection front of the material in the cavity. Since this front is substantially in the same axial plane, the orientation of the reinforcing wires at an angle $\alpha$ greater than 60 degrees relative to the circumferential direction enables them to resist any shifting induced by this injection front. Consequently, the position of the circumferential reinforcing wires arranged under the supplementary reinforcing elements is also maintained in the desired position by the designer of the support.

It should be noted that these supplementary reinforcing elements play no functional role for the support during operation. Their role is limited to facilitating the creation of supports whose circumferential reinforcing wires are arranged according to the wishes of the designer of the support.

In a first embodiment, the feed points being substantially arranged in the same equatorial plane, substantially in the center portion of the support body, the supplementary reinforcements extend axially over a length 2L equal to or greater than one-third of the axial width of the support base. The axial extension of the supplementary reinforcing elements is preferably limited to one-half the base of the support.

In a second embodiment, the feed points being substantially arranged in the same equatorial plane on one side of said support, the supplementary reinforcements surround the axial end of the set of circumferential reinforcing wires on the support side and extend axially and externally relative to all the circumferential reinforcing wires over a length L equal to or greater than 10 mm. Preferably, L is equal to or less than 30 mm.

In the latter case, it has been found that a length L of less than 10 mm was insufficient to limit efficiently the movements of the circumferential reinforcing wires due to the entrainment phenomenon linked to the injection front of the material injected during the pressurized injection into the mold. On the other hand, over 30 mm in length, the effect is practically always similar. This would add to the cost and weight of the support without producing any improvement in the precision of placement of the circumferential wires.

The nature of the supplementary reinforcing wires can be very varied. One may use a twilled fabric or two plies with wires oriented along +α and −α. It is also possible to have a single ply with wires oriented at an angle α equal to or greater than 80 degrees and preferably 90 degrees.

In the context of this invention, the term support will cover a support, an accessory designed to be mounted inside a tire to give it a temporary operating mode at zero pressure, a non-pneumatic casing designed to be used alone in normal service, with adaptations as to choice of component materials and/or design of the object itself not being the purpose of this patent application. In other words, this invention can find application regardless of the precise destination of the item, and is not limited to a particular design of the molded object, provided it is reinforced by wires, nor to a particular material, provided it can be achieved by pressurized injection into a closed cavity.

DESCRIPTION OF THE DRAWINGS

The following description illustrates preferred embodiments of the invention. In the various figures.

DESCRIPTION OF PREFERRED EMBODIMENTS

Figure 1:
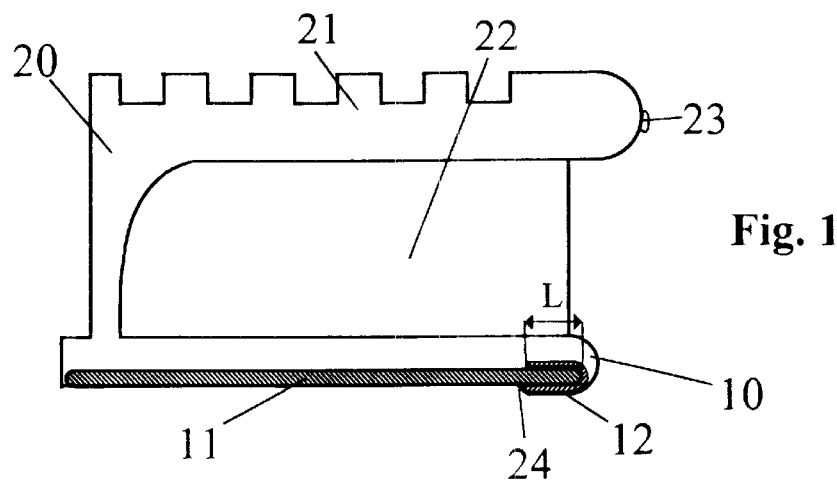
FIG. 1 is an axial section of a safety support according to the invention.

FIG. 1 shows an axial section of a safety support according to the invention. This support corresponds substantially to the one described in patent application EP 0,796,747. This support includes a generally ring-shaped base 10 and a body 20. The body includes a crown 21 as well as a series of recesses 22 which extend axially into the center portion of the body and are open on only one side. These recesses are distributed regularly over the entire circumference of the body 20. The crown of the body also includes a protuberance 23 which is formed due to the fact that the support is made by injection. Said protuberance 23 indicates the presence of a material feed point during the injection process. The protuberances 23 are distributed regularly over the circumference of the crown 21.

The base 10 is reinforced by a ply 11 whose reinforcing wires are oriented longitudinally, substantially at 0 degrees. It also includes a ply 12 which surrounds the axial end of the ply 11 on the side of the protuberances 23. The ply 12 consists of a reinforcing wire oriented at 90 degrees relative to the circumferential direction of the support. This ply 12 extends axially on both sides of the ply 11, over a distance L between 10 and 30 mm. The ply 12 is arranged axially with respect to the protuberances 23. In other words, it protects the circumferential reinforcing wires closest to the protuberances 23. The radial thickness of the base 10 opposite the recesses 22 of the body 20 is not very great, typically under 15 mm.

It is also clear that the radially internal face of the base 10 includes a radial inner projection 24 on the side of the ply 12 such that the presence of the ply 12 does not locally modify the actual diameter of the circumferential reinforcing wires of the ply 11.

It should be noted that the ply 12 could also extend radially and internally relative to the ply 11 over the entire axial width of the support base. In this case, it would be pointless to provide for a projection 24, since all the circumferential wires of the ply 11 would be arranged at an equal distance from the axis of rotation of the support.

Figure 2:
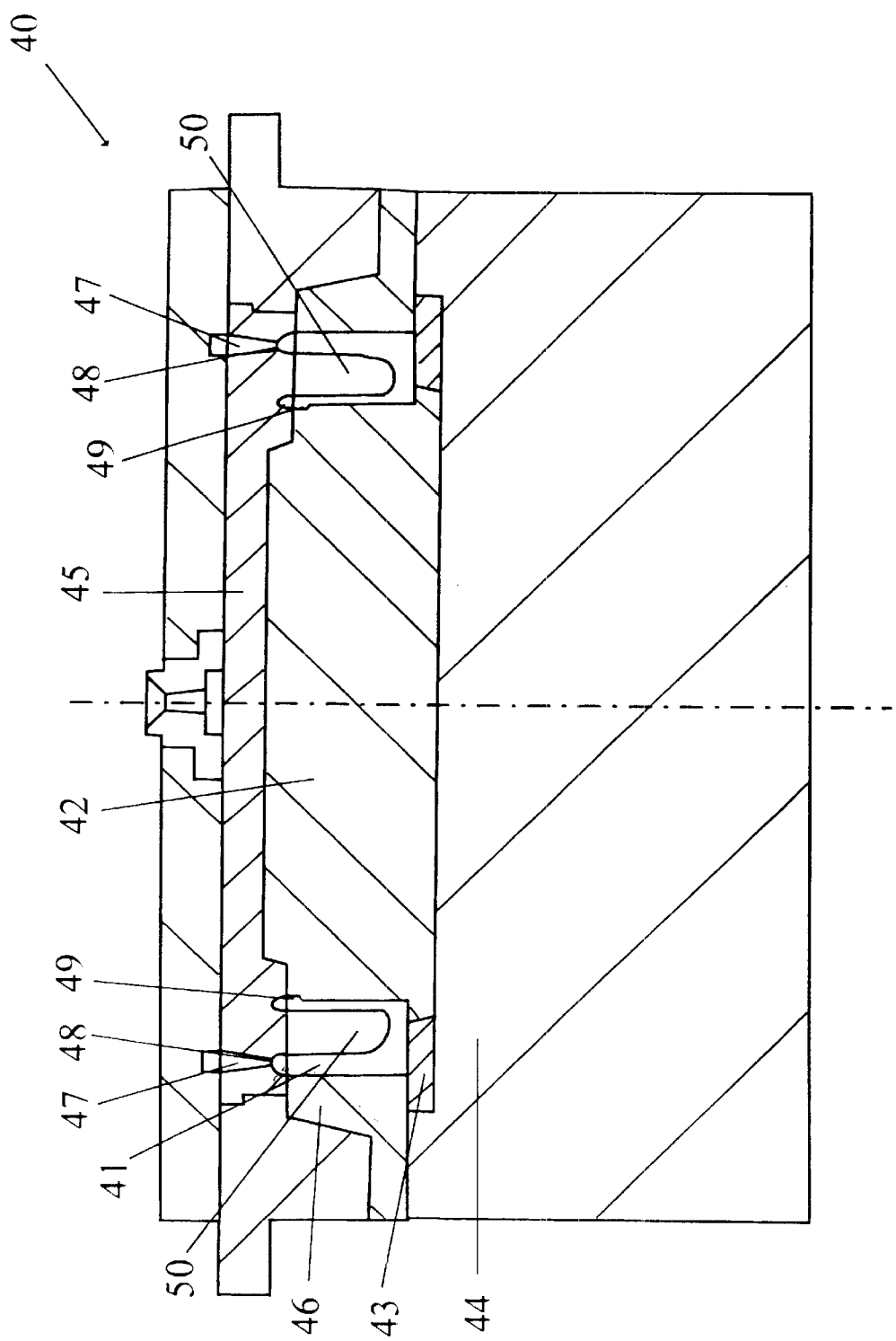
FIG. 2 is an axial section of a mold to make the support in FIG. 1.

FIG. 2 shows an axial section of an injection mold of a support according to the invention. One can see the molding cavity 41, which molds the shape of the support. This cavity 41 is defined by an internal core 42 and supplementary parts such as a lower plate 43 (mounted on a plate-holder 44), an upper plate 45 and wire segments 46 molding the support surface per se, located radially outside the support.

Because it is desired to mold the grooves and bosses onto the support surface (see FIG. 1), the latter surface is molded by a number of wire segments 46 capable of radial movement. Two of the injection channels 47 for the material during the filling of the cavity can be seen. These channels define the feeding points 48. These points are regularly laid out on the circumference of the support. In the embodiment described, the feed points 48 are arranged substantially in the same equatorial plane of the mold, that is to say a plane perpendicular to the axis of the mold, on the same side of the support.

The upper plate also includes fingers 50 forming protuberances which mold the recesses 22 of the support.

The mold 40 is installed in an injection press including means (not shown) to control the movement of the segments 46 and is equipped with a mechanism capable of imparting a relative to-and-fro movement of the plate-holder 44 and of the upper plate 45. This relative to-and-fro movement permits the opening of the mold specifically to remove the support after vulcanizing.

Usually, a support as shown in FIG. 1 is made as follows. A ring is prefabricated forming a kind of belt containing the ply 11 of circumferential reinforcing wires, as well as the complementary ply 12. To make such a ring, one may, for example, use a chuck comparable to a drum for the first stage of manufacture of a tire. On this chuck is placed a ply 12 of length 2L which contains reinforcing wires oriented 90 degrees from the circumferential direction of the chuck enclosed in an elastomer sheath; then, a ply 11 of wires oriented at 0 degrees and sheathed in an elastomer material is applied partially covering the ply 12. This ply can consist of a single wire sheathed in rubber, a bead strip of wires calendered in rubber, or a ply of wires calendered in rubber, a process well known for the manufacture of the zero-degree reinforcements ordinarily found at the crown of tires for passenger cars. Finally, the free end of the ply 12 is folded over onto the ply 11. Since the ply 11 has substantially inextensible circumferential reinforcing wires, its development must substantially correspond to the development of the radially internal wall of the core 42. This wall involves a projection 49 on the side of the feed point 48 in order to account for the thickness of the ply 12.

Then, with the upper plate 45 of the mold 40 open, the ring thus prepared introduced into the cavity 41 starting at the end of the ply 11 opposite the ply 12.

The mold is closed by bringing the upper plate 45 to the interior plate 43 as well as bringing the segments 46 radially into molding position.

The rubber is injected at an appropriate temperature into the cavity 41 through feed points 48.

After the rubber has been fully pressed down into the cavity, the rubber is allowed to vulcanize, the molding cavity is opened, and the support is removed.

When the rubber is injected into the cavity 41 through channels 47 and feed points 48, the front part of the material being pressed down will gradually fill the cavity 41, first coming up against the ply 12 arranged opposite the feed points 48 prior to gradually coming into axial contact with the entire wall radially outside the ply 11. The flow of rubber will have the effect of pulling this ply 12 in the direction of the still-free end of the support. Since this ply 12 has wires oriented in the direction of flow and well anchored on either side of the end of the ply 11, this ply 12 will oppose the movement induced by the flow of material and will permit the wires of the ply 11 to come to rest in their original position.

It should be noted that anchoring the ply 11 over a length L of between 10 and 30 min is sufficient to achieve under the usual injection pressure and temperature conditions good stability of the reinforcements of the support base.

Figure 3:
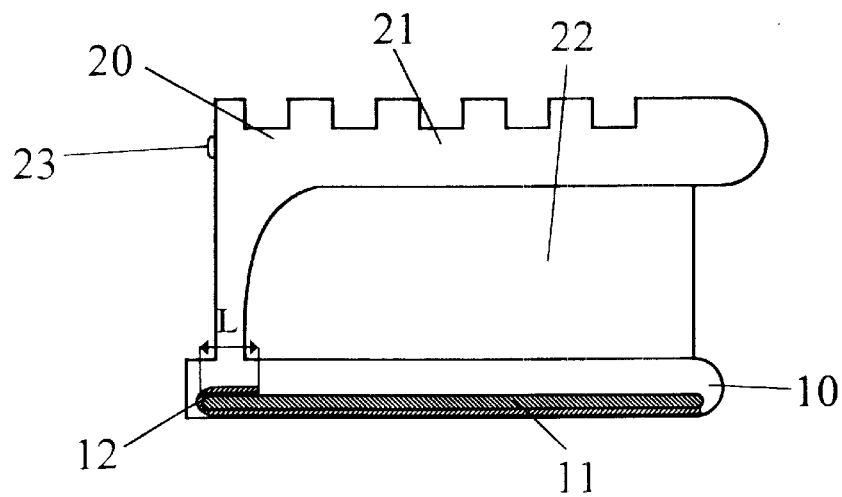
FIG. 3 is an axial section of a second form of embodiment of a support according to the invention.

FIG. 3 presents a second embodiment of a support according to the invention. In this case, the protuberances 23 corresponding to the material feed points during the process of injection into the mold cavity are arranged on the non-opening side of the recesses 22. Consequently, the ply 12 is arranged on the same side of the recesses. To guarantee a homogeneous layout of the circumferential reinforcing wires, it should be noted that the ply 12 extends axially externally relative to the ply 11 over a length L as above. On the other hand, this ply 12 extends under the ply 11 over the entire width of the ply 11. Consequently, the radially internal surface of the support can be completely cylindrical.

This form of embodiment corresponds to a reverse arrangement of the mold recesses. In this case, the recesses 50 are attached to the lower plate and not to the upper plate.

Figure 4:
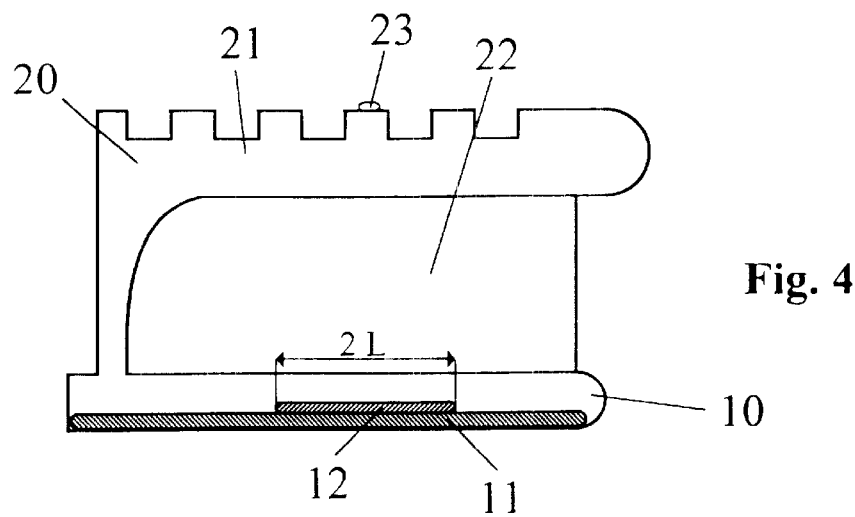
FIG. 4 is an axial section of a third form of embodiment of a support according to the invention.

FIG. 4 presents an embodiment of the support in which the protuberances are arranged more or less axially in the central part of the support body. In this case, the ply 12 is arranged opposite the axial plane of these protuberances substantially in the middle of the ply 11. The ply 12 extends axially over a length 2L ranging between one-third and one-half the axial width of the support base. The ply 12 extends axially on either side of the axial plane of the protuberances 23. It has been observed that the axial width of the ply 12 in this form of embodiment should be a function of the axial width of the support.

This embodiment corresponds to feed channels 48 traversing the segments 45.

I claim:

1. A safety support to be mounted on a vehicle rim and created by injection under pressure into a closed cavity through feed points, said support having an axis of rotation, a base having a substantially cylindrical radially internal face which is to be mounted around said rim, and a body forming a support attached to the base, said base embodying a set of substantially inextensible circumferential reinforcing wires sheathed in an elastomer material and said body having protuberances corresponding to said feed points wherein said base includes supplementary reinforcing elements arranged, at least in part, radially and externally relative to said set of circumferential reinforcing wires and axially with respect to said protuberances.

2. A support according to claim 1 in which said supplementary reinforcing wires include reinforcing elements oriented at an angle α equal to or greater than 60 degrees relative to the circumferential direction.

3. A support according to claim 1 in which said feed points are arranged substantially in the same equatorial plane, substantially in the center portion of the body of the support, and said supplementary reinforcing elements extend axially over a length 2 L equal to or greater than one-third of the axial width of the base of said support.

4. A support according to claim 3 in which the supplementary reinforcements extend axially over a length 2 L less than half the axial width of the base of the support.

5. A support according to claim 1 in which these feed points are arranged substantially in the same equatorial plane on one side of said support, the supplementary reinforcements surround the axial end of said set of circumferential reinforcing wires on the side of said support and extend axially and externally relative to the set of circumferential reinforcing wires, over a length L equal to or greater than 10 mm.

6. A support according to claim 5 in which the supplementary reinforcing elements extend axially over a length L equal to or less than 30 mm.

7. A support according to claim 1 in which said reinforcing elements comprise a twilled fabric with the wires oriented along +α and −α.

8. A support according to claim 1 in which said reinforcing elements comprise two plys with wires oriented along +α and −α.

9. A support according to claim 1 in which said reinforcing elements include a ply with wires oriented at an angle a equal to or greater than 80 degrees relative to the circumferential direction.

10. A support according to claim 9 in which said wires are oriented at 90 degrees relative to the circumferential direction.

* * * * *